(12) United States Patent  
Van Der Merwe

(10) Patent No.: US 9,360,891 B1
(45) Date of Patent: Jun. 7, 2016

(54) RECESSED USB PORT

(71) Applicant: Steven Van Der Merwe, Creston (CA)

(72) Inventor: Steven Van Der Merwe, Creston (CA)

( * ) Notice: Subject to any disclaimer, the term of this patent is extended or adjusted under 35 U.S.C. 154(b) by 170 days.

(21) Appl. No.: 13/766,147

(22) Filed: Feb. 13, 2013

(51) Int. Cl.
  *G06F 1/16* (2006.01)
(52) U.S. Cl.
  CPC ............ *G06F 1/1633* (2013.01); *G06F 1/1601* (2013.01)
(58) Field of Classification Search
  CPC ........................................................ G06F 1/16
  USPC ............................... 361/679.27, 684; 353/119
  See application file for complete search history.

(56) References Cited

U.S. PATENT DOCUMENTS

| | | | |
|---|---|---|---|
| 5,757,616 A * | 5/1998 | May et al. ................. | 361/679.57 |
| 6,567,273 B1 * | 5/2003 | Liu et al. ...................... | 361/737 |
| 6,724,614 B1 * | 4/2004 | Chiang et al. ............ | 361/679.44 |
| 7,354,285 B1 * | 4/2008 | Lin ....................... | H01R 13/633 |
| | | | 439/159 |
| 7,857,659 B2 | 12/2010 | Wang et al. | |
| 7,866,996 B2 | 1/2011 | Achsaf et al. | |
| 2002/0141147 A1 * | 10/2002 | Ando ..................... | G06F 1/1616 |
| | | | 361/679.32 |
| 2004/0032394 A1 * | 2/2004 | Ayatsuka et al. ............. | 345/156 |
| 2004/0075977 A1 | 4/2004 | Lee | |
| 2007/0070308 A1 * | 3/2007 | Chen ...................... | G03B 21/10 |
| | | | 353/119 |
| 2008/0204992 A1 | 8/2008 | Swenson et al. | |

* cited by examiner

*Primary Examiner* — Dion R Ferguson
*Assistant Examiner* — Mandeep S Buttar
(74) *Attorney, Agent, or Firm* — Robert C Montgomery; Montgomery Patent & Design LP

(57) ABSTRACT

A computer housing comprises a recessed Universal Serial Bus (USB) slot located along a top surface of a computer adjacent to the keyboard portion. The USB slot is recessed into the computer in order to allow a user to attach a USB mass storage device below a top surface portion in a secure position, thereby avoiding damage to the mass storage device if accidentally impacted while connected.

8 Claims, 3 Drawing Sheets

RECESSED USB PORT

RELATED APPLICATIONS

There are no current co-pending applications.

FIELD OF THE INVENTION

The invention described herein pertains to computer case having a recessed slot configured to fully maintain an attached mass storage device therewithin such that the mass storage device does not extend outwardly from the computer case.

BACKGROUND OF THE INVENTION

Universal Serial Bus (USB) memory devices or flash drives are truly a modern marvel. They are capable of holding vast amounts of information that was only dreamed about a few short years ago. In fact, the amount of information they are capable of holding allow a number of computer users to carry not only all of the data files they need but their applications as well. This allows them to make any computer they use their own "personal" computer. These devices plug into common USB jacks on desktop and notebook computers.

However, their design leaves them protruding at all times making them prone to breakage and damage of itself and/or the computer to which it is attached. Desktop computers sitting on the floor are susceptible to damage whenever a person or chair may brush against them. Portable computers cannot be placed into bags or sleeves with such devices attached forcing a shutdown just to move what is otherwise a portable computer. Accordingly, there exists a need for a means by which a USB memory device can be used with all types of computers without the disadvantages as described above. The use of a recessed USB Port allows one to use USB memory devices in computers without worry of damage to either component in a manner which is quick, easy and effective.

SUMMARY OF THE INVENTION

The inventor has recognized the deficiencies in the art pertaining to insertion and retention of a USB mass storage device within notebook computers.

An object of the present invention provides for a computer case having conventional features and devices associated with computers, such as a bottom section having processor, a memory storage device, mouse pad, a keyboard, a plurality of input ports, a plurality of user interface buttons, and a speaker; and a upper section hingedly attached to said bottom section and further having a display. One (1) of the plurality of input ports is configured to electrically connect a mass storage device to the computer and housed within a recessed slot.

Another object of the present invention is to provide such a slot having a generally rectangular five-sided shape. The slot is configured such that a port for providing an electrical connection for a mass storage device to the computer aligns and maintains the mass storage device within the slot such that the mass storage device does not extend outward from the case.

In at least one (1) embodiment, the slot is located within an upper surface of the bottom section. The slot is located parallel to the side surface of the bottom section and is approximately three-quarters of an inch (¾ in.) in width and two-and-a-half inches (2½ in.) in length. The mass storage port is located on a side wall of the slot.

In another embodiment, the slot is located within a bottom surface of the bottom section. The slot is located parallel to the side surface of the bottom section and is approximately three-quarters of an inch (¾ in.) in width and two-and-a-half inches (2½ in.) in length. The mass storage port is located on a side wall of the slot.

In yet another embodiment, the slot is located within a side surface of the bottom section. The slot is located perpendicular to the side surface of the bottom section and is approximately two-and-a-half inches (2½ in.) in length. The mass storage port is located on a rear wall of the slot opposite the opening.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
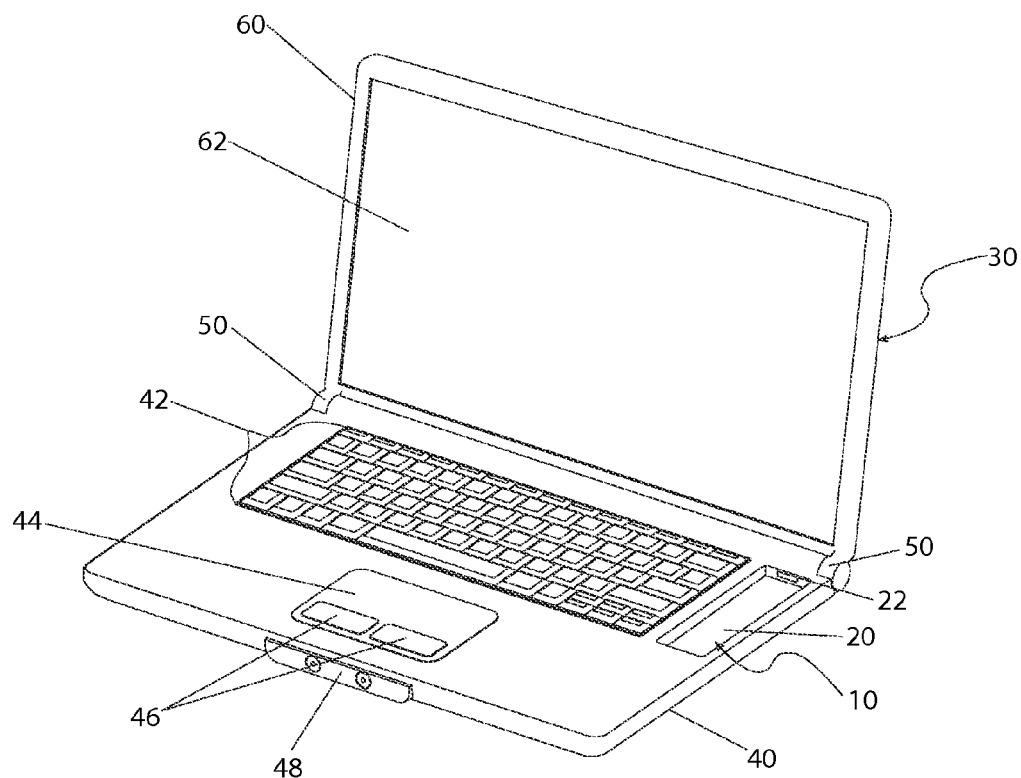
FIG. 1 is a perspective view of a computer case with a recessed USB) port 10, according to a preferred embodiment of the present invention.

10 computer case with a recessed USB port
20 recessed USB slot
22 USB port
24 internal cable
30 computer
40 first lower case
41 internal space
42 keyboard
44 mouse pad
46 button
48 audio terminal
50 hinge
60 upper case
62 display
100 portable mass storage device
101 USB connector
200 internal USB port embodiment
210 second lower case
220 internal USB cavity

DETAILED DESCRIPTION OF THE PREFERRED EMBODIMENT

Figure 2:
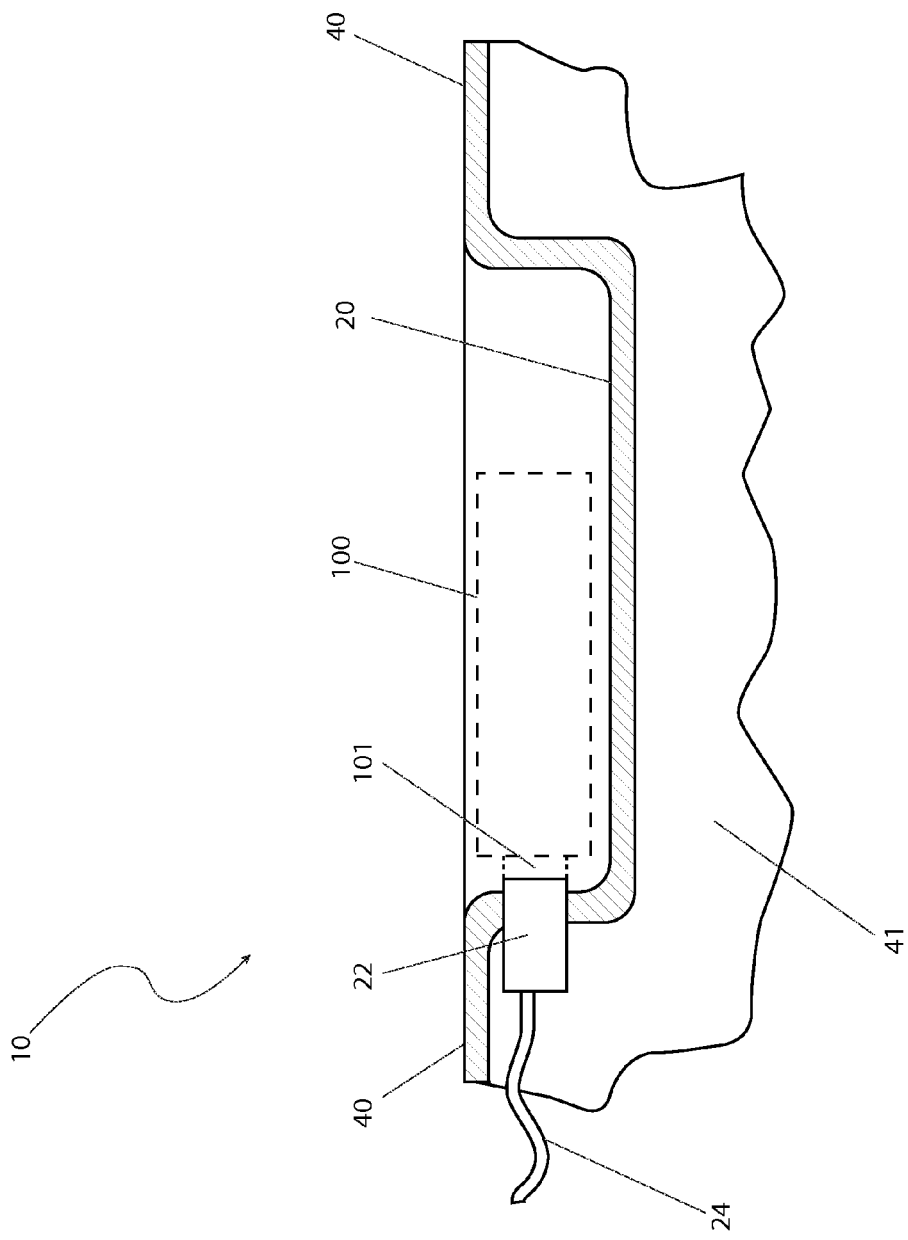
FIG. 2 is a section view of a recessed USB port portion 20 of the computer case with a recessed USB port 10 taken along section line A-A (see FIG. 1), according to a preferred embodiment of the present invention; and, FIG. 3 is an internal USB port embodiment 200, according to an alternate embodiment of the present invention.
Figure 3:
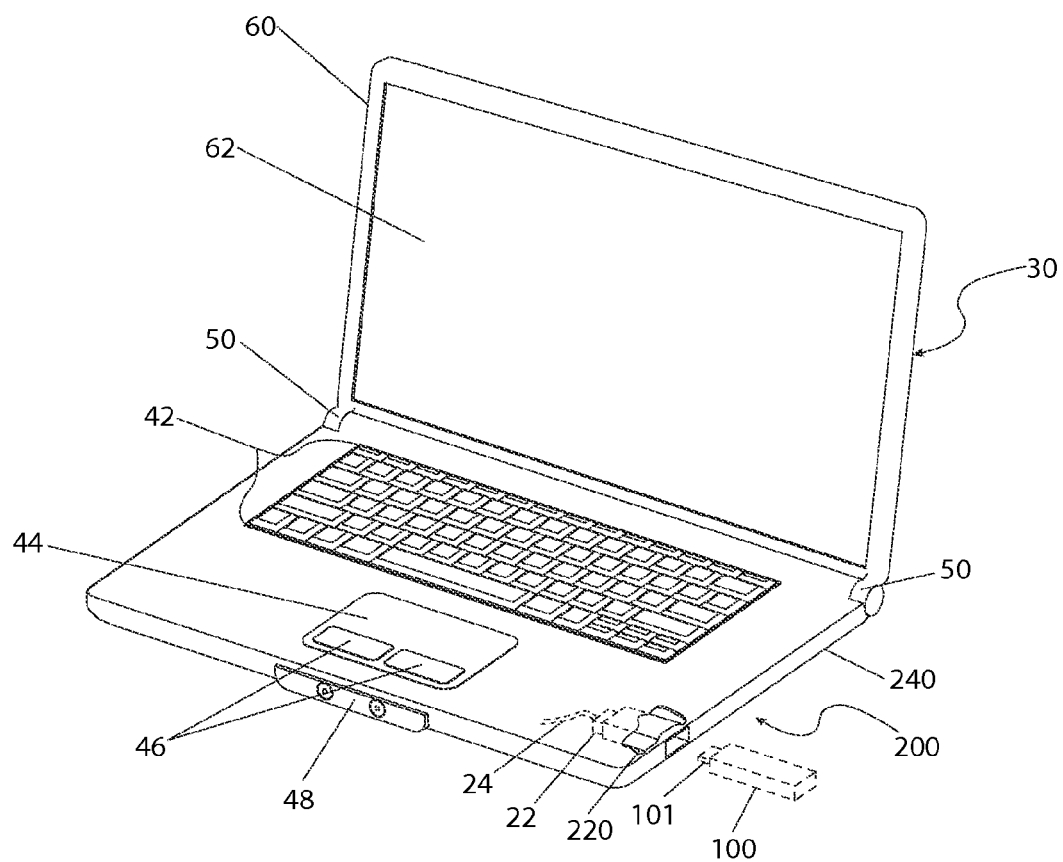

The best mode for carrying out the invention is presented in terms of its preferred embodiment, herein depicted within FIGS. 1 and 2, and in terms of an alternate embodiment, herein depicted in FIG. 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Referring now to FIG. 1, a perspective view of a computer case with a recessed USB port (herein described as the "feature") 10, which provides integration of an enhanced feature into a desktop or notebook-type personal computer system 30 enabling protective installation of various portable USB-type portable mass storage devices 100, as well as similarly shaped mobile broadband dongles/sticks, via an integrally-molded recessed USB slot 20. The feature 10 is depicted here being a unitary recessed area integrated into a laptop-type computer 30. Said laptop-type computer 30 is illustrated here having conventional and expected portions including a lower plastic molded case 40, a keyboard 42, a mouse pad 44, a plurality of digit-operated buttons 46, an audio terminal 48, a pair of hinges 50, an upper case 60, and a flat screen display 62. The feature 10 is intended to allow transport of the computer 30 with the portable mass storage device 100 installed, without worry of breakage or damage.

It is understood that the computer 30 may incorporate a plurality of units of the present invention 10 being integrated a various locations upon the computer 30, and as such should not be interpreted as a limiting factor of the invention. The feature 10 is illustrated here comprising a five-sided recessed USB slot 20, thereby positioning the portable mass storage device 100 below a top surface portion and in a parallel manner with regards to a side edge portion. The feature 10 may also be integrated into the case portions 40, 60 in various other positions and orientations (see FIG. 3). It is envisioned that the feature 10 would have a rectangular cross-sectional shape of approximately three-quarters of an inch (¾ in.) in width and two and one-half inches (2½ in.) in length. The recessed USB slot 20 is to be sized so as to accept most commonly sized USB portable mass storage devices 100 of all memory capacities. The feature 10 protects the USB portable mass storage device 100 as well as a USB port portion 22 of the computer 30 from damage should the drive be accidentally impacted. The feature 10 also allows notebook-type computers 30 to be placed in bags, or similar containers, and transported while the portable mass storage device 100 remains connected.

Referring now to FIG. 2, a section view of a recessed USB slot portion 20 of the feature 10 taken along section line A-A (see FIG. 1), according to a preferred embodiment of the present invention, is disclosed. The feature 10 is envisioned being integrally-molded into a top surface portion of the lower case 40 and protruding downward into an internal space portion 41 of the computer 30; however, said feature 10 may also be integrated into a bottom surface portion with equal benefit, and as such should not be interpreted as a limiting factor of the invention 10. The feature 10 provides nested positioning of the portable mass storage device 100 into the lower case 40 such that the USB connector portion 101 of said portable mass storage device 100 is pre-aligned with a corresponding USB port portion 22 of the computer 30, thereby providing sliding insertion of the portable mass storage device 100.

Referring now to FIG. 3, an internal USB port embodiment 200, according to an alternate embodiment of the present invention, is disclosed. An internal USB cavity 220 is illustrated here being integrated into the lower case portion 40 of the computer 30 so as to enable insertion of a small end portion of a portable mass storage device 100 in a perpendicular direction into an internal USB cavity portion 220 within the computer 30. The internal USB cavity 20 is located along a side surface of the computer 30 and is sufficiently recessed so as to allow a principle portion of the inserted portable mass storage device 100 to remain within the lower case portion 40, thereby providing protection to the portable mass storage device 100.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the feature 10, it would be utilized as indicated in FIG. 1.

The method of utilizing the feature 10 may be achieved by performing the following steps: procuring a model of a desktop, laptop, or other type computer 30 being equipped with at least one (1) unit of the present invention feature 10; placing a portable mass storage device 100 or mobile broadband dongle/stick down into the recessed USB slot 20; push the portable mass storage device 100 horizontally toward the USB port portion 22 of the computer 30 until the corresponding USB connector portion 101 of the portable mass storage device 100 is fully engaged; operating the computer 30 and the portable mass storage device 100 in a normal manner to perform computing tasks; and, benefiting from added protection of a portable mass storage device 100 while connected to a computer 30 afforded a user of the present invention 10.

An alternate internal USB port embodiment 200 may be utilized by inserting a USB connector portion 101 of the portable mass storage device 100 into the horizontal internal USB cavity portion 220 until fully engaged.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A computer case, comprising:
   an upper section comprising a display;
   a bottom section hinged to said upper section such that said upper section can close over said bottom section, said bottom section having a top surface having a top accessible five-sided recessed USB slot for receiving the body of a USB device and a USB port accessible from within said USB slot for receiving the connector of a USB device;
   wherein said recessed USB slot and said USB port are recessed such that a USB device inserted into said USB slot and into said USB port is fully below said top surface; and,
   wherein a USB device inserted into said USB slot and into said USB port does not interfere with said upper section closing over said bottom section.

2. The computer case of claim 1, further comprising a notebook-style computer.

3. The computer case of claim 1, wherein said recessed USB slot is located parallel relative to a side edge of said bottom section; and, wherein said USB port is located on a side wall of said recessed USB slot.

4. The computer case of claim 1, wherein said recessed USB slot comprises a shape of approximately ¾ inch in width and 2½ inches in length.

5. A computer case, comprising:

an upper section comprising a display;

a bottom section hinged to said upper section, said bottom section having a said bottom surface having a bottom accessible five-sided recessed USB slot for receiving the body of a USB device and a USB port accessible from within said USB slot for receiving the connector of a USB device;

wherein said USB slot and said USB port are adapted to maintain a USB device connected to said and to said USB port without extending outward from said bottom section.

6. The computer case of claim 5, further comprising a notebook-style computer.

7. The computer case of claim 5, wherein said USB slot is located parallel relative to a side edge of said bottom section; and, wherein said USB port is located on a side wall of said USB slot.

8. The computer case of claim 5, wherein said USB slot comprises a shape of approximately ¾ inch in width and 2½ inches in length.

* * * * *